United States Patent [19]

Rempt

[11] Patent Number: 4,686,022

[45] Date of Patent: Aug. 11, 1987

[54] METHOD AND APPARATUS FOR PRODUCING A MONATOMIC BEAM OF GROUND-STATE ATOMS

[75] Inventor: Raymond D. Rempt, Woodinville, Wash.

[73] Assignee: The Boeing Company, Seattle, Wash.

[21] Appl. No.: 779,826

[22] Filed: Sep. 25, 1985

[51] Int. Cl.$^4$ .................. B01J 19/12; B01D 53/32; H01J 49/20

[52] U.S. Cl. .................. 204/157.41; 250/298; 313/359.1; 313/361.1; 315/111.41; 335/210

[58] Field of Search .................. 204/157.41; 250/298, 250/299; 315/111.21, 111.41; 313/359.1; 335/210

[56] References Cited

U.S. PATENT DOCUMENTS

| | | | |
|---|---|---|---|
| 3,772,519 | 11/1973 | Levy et al. | 204/157.22 |
| 3,843,351 | 10/1974 | Smith et al. | 250/298 |
| 3,893,845 | 7/1975 | Mahaffey et al. | 250/298 |
| 3,942,975 | 3/1976 | Drummond et al. | 250/298 |
| 3,992,625 | 11/1976 | Schmidt et al. | 250/284 |

FOREIGN PATENT DOCUMENTS 3223251 12/1983 Fed. Rep. of Germany .................. 204/157.41

OTHER PUBLICATIONS

Raymond Doak Rempt, "Electron Impact Studies of Electron . . . Gases", Final Report, pp. ii through 92, Sep. 30, 1969.

Primary Examiner—Howard S. Williams
Attorney, Agent, or Firm—Christensen, O'Connor, Johnson & Kindness

[57] ABSTRACT

A specimen of molecules containing the desired element is contained in a low-pressure environment and is exposed to a beam of electrons of predetermined energy, causing the electrons to be captured by the molecules. The reaction is chosen so that there is a natural dissociation into an ion containing the desired element. The reaction region is subjected to an electrical field that accelerates the ions and removes them from the reaction region, at which time the ions are exposed to a laser beam of a wavelength sufficient to photodetach a substantial number of electrons from the ions, producing neutral atoms of the desired element. The entire particle stream exiting the interaction region is subjected to a magnetic field that bends the charged ions away from the neutral atoms so that the neutral atoms can then be directed to a test specimen or collection device, as the case may be. The apparatus for carrying out the method includes a pressure vessel for maintaining the environment in which the reactions take place at a pressure in the neighborhood of $10^{-4}$ Torr and, typically, the same magnetic field that is used to separate the ions from the neutral atoms is also used to collimate the electron beam for better localization, to interact with the molecules.

13 Claims, 2 Drawing Figures

METHOD AND APPARATUS FOR PRODUCING A MONATOMIC BEAM OF GROUND-STATE ATOMS

BACKGROUND OF THE INVENTION

This invention relates to the production of a monatomic beam in which substantially all of the atoms are of a ground state and, more particularly, relates to the production of a monatomic beam of oxygen produced by photodetachment of electrons from oxygen ions in the presence of a magnetic field.

In certain test environments it is desirable to produce a beam of atoms of a particular element that are neutral in charge in the ground state. One example of such a situation is in the research surrounding the provision of a space station in low earth orbit. In order to test the reaction of materials to be utilized in the space station, it is necessary to simulate the atmospheric conditions at a height of 200 to 600 kilometers, which is typical low earth orbit altitude. It has been found by previous experiments that the atmospheric condition at such an altitutde is comprised of essentially neutral atomic oxygen with a flux of approximately $10^{15}$ atoms/cm$^2$-second, with an effective energy of approximately five electron volts due to spacecraft orbital speed. Previous attempts to produce neutral atomic oxygen beams have produced either beams of the required energy but with low flux rates, or beams with the required flux rate but in which the atoms were of a low energy. In either case, the beams are impure and sometimes ionic.

Many problems have arisen in previous attempts to produce neutral atomic oxygen beams in the five to eight electron volt energy, and $10^{15}$ atoms/cm$^2$-second flux range. Past attempts have often been based on heating molecular gases to extremely high tempratures to obtain neutral atoms with high translational velocities in order to achieve energies of five electron volts. However, this procedure results in high percentages of ionized species and also a high percentage of electronically excited-state species, which are not present at low earth orbital altitudes and which will react at different rates from the neutral species that are present at such altitudes. The ionized species can be filtered out at the exit plane of the beam apparatus to leave only the neutral atoms; however, this results in a severe loss of flux. Removing the electronically excited species is even more difficult and has been performed by quenching the excited states, using a proper mixture of inert foreign gases, such as argon or krypton. The quenching procedure, however, results in an impure beam and a loss of kinetic energy of the ground-state species. Therefore, it is an object of the present invention to provide a method and apparatus to produce a beam of atomic oxygen of neutral charge in which substantially all of the atoms are at the ground state and to provide such a beam of energy and flux density that simulates the atmospheric conditions at low earth orbital altitudes.

It is another object of this invention to provide a method and apparatus for producing monatomic beams of other elements in which the atoms are at the ground state and are of a predetermined energy.

SUMMARY OF THE INVENTION

To accomplish the objects discussed above, the invention utilizes the process of electron capture by particular molecules, followed by dissociation of the charged molecule into components, one of which is the negative ion of the desired element. The ions are drawn off by application of an electric field of a predetermined potential difference such that the ions drawn off are of a desired energy. The ion stream is then exposed to a laser beam of a wavelength sufficient to photodetach electrons from a substantial number of the ions. The ion stream is, at the same time, acted upon by a magnetic field that tends to curve the path of the ions but not affect the path of the neutral atoms of the desired element from which the electrons have been photodetached. The differing reaction to the magnetic field results in separation of the streams that provides the desired beam of atoms of the desired element of neutral charge and at a ground state.

For example, in the production of a neutral atomic oxygen beam, an electron stream collimated by a magnetic field is introduced into a nitrous oxide ($N_2O$) environment, which is at a pressure near vacuum; for example, in the range of $10^{-4}$ Torr. The electrons will attach themselves to the $N_2O$ molecules, which will then naturally dissociate according to the following reaction:

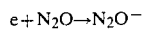

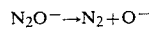

The negative oxygen ions ($O^-$) are drawn out of the interaction region by an applied electric field of a potential that is determined by the desired energy of the atoms in the resultant atomic beam. The drawn out negative oxygen ions are presented to a laser with a wavelength that is slightly shorter than the wavelength corresponding to the electron affinity of the oxygen atom. Upon exposure to the laser beam a fraction of the negative oxygen ions experience photodetachment of the excess electron producing neutral oxygen atoms. A magnetic field is applied that causes the charged negative oxygen ions to be bent away from their original path; however, the photodetached neutral oxygen atoms are unbent and proceed to a target or collection area, depending upon the use for the neutral atomic oxygen beam. Other neutral atomic element beams can be produced utilizing different reactions and different wavelength lasers.

BRIEF DESCRIPTION OF THE DRAWINGS

The invention will be better understood by those of ordinary skill in the art and others upon reading the ensuing specification when taken in conjuction with the drawings appended hereto, wherein.

DETAILED DESCRIPTION OF THE PREFERRED EMBODIMENT

Figure 1:
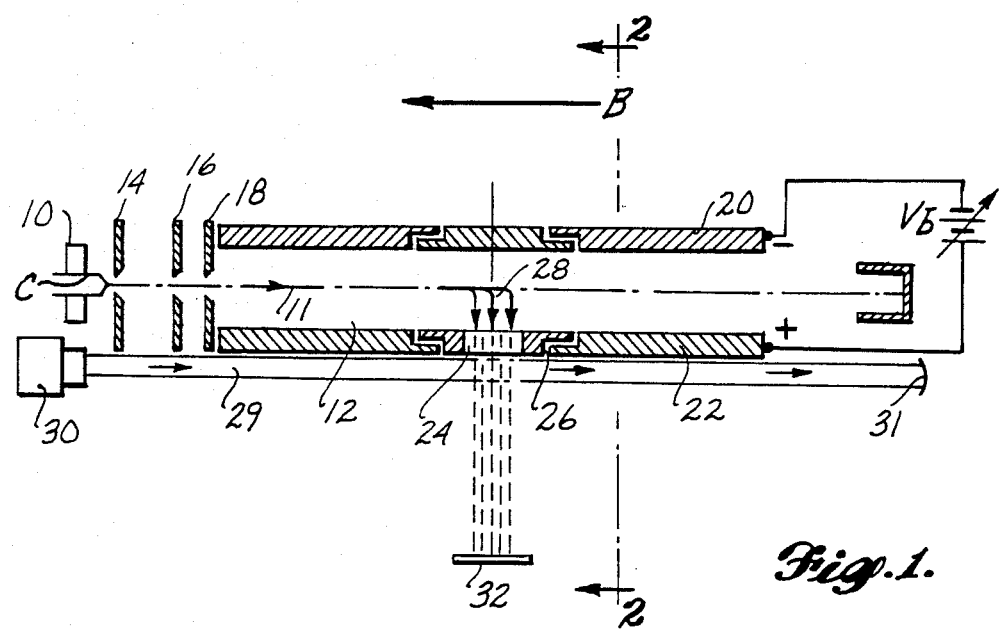
FIG. 1 is a somewhat schematic representation of an apparatus to carry out the present invention.

A somewhat schematic representation of an apparatus for producing a monatomic beam of atoms in a neutral ground state is shown in FIG. 1. The following discussion will set forth the principles of the present invention as utilized to produce a beam of neutral-charged oxygen atoms in the ground state; however, it should be realized by those of ordinary skill in the art and others that the particular reactions discussed and the beam produced are exemplary only and other reactions can be used to produce beams of other elements, as will be discussed later. Referring now to FIG. 1, an electron gun 10 includes a heated cathode C that emits a stream of electrons 11 into a reaction area 12 containing nitrous oxide ($N_2O$) at low pressure (approximately $10^{-4}$ Torr). Preferably, the cathode is indirectly heated so that the electrons come off with a smaller energy spread than in a conventional, directly heated "hairpin" filament.

Next to the cathode are three grids 14, 16, and 18, respectively. The grids act as a type of lens system to collimate the electron beam and also to narrow the energy range of electrons entering the space 12. Also, the girds can be used to define the physical cross section of the electron beam. The grids are each charged electrically, as is well known in the art, to produce the desired effects. For the purpose of the production of oxygen atoms, the girds were charged to produce an electron beam containing substantially all electrons in the 2.2 electron volt energy range. This was done to put the electrons at the peak of the dissociation reaction, explained below.

In this exemplary set-up, the invention utilizes the process of electron capture in nitrous oxide, using an electron of about 2.2 electron volts, collimated further by a magnetic field B. The direction of the magnetic field is to the left as viewed in FIG. 1, so that the lines of the magnetic field are parallel to the path of the electron stream 11 from the electron gun 10. At the energy level of 2.2 electron volts, the electrons will attach to the $N_2O$ molecules which will then naturally dissociate in a short span of time (approximately $10^{-13}$ seconds) according to the following reactions:

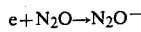

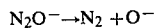

Still with reference to FIG. 1, the space 12 is subjected to an electric field by charging a pair of parallel plates 20 and 22, respectively. Plate 22 is charged positively with respect to plate 20 and draws the negative oxygen ions formed in the reaction described above toward it. A collection opening 24 is formed in a center-plate 26 positioned in the positively charged plate 22. The negative oxygen ions drawn out of the interaction region 12 by the electric field form a stream as indicated by arrows 28. As the negative oxygen ions leave the interaction region, they are subjected to a beam of laser light 29 from a laser source 30 whose wavelength is slightly shorter than the wavelength corresponding to the election affinity of the oxygen atom (approximately 0.75 microns). A portion of the negative oxygen ions will experience photodetachment of the excess electrons thereby producing neutrally charged oxygen atoms. To maximize the incidence of photo detachment the interaction between the laser beam and ions should occur as an intracavity interaction. Therefore, a mirror 31 is provided to maintain a reflection of the laser beam between the source 30 and the mirror 31, thus the interaction region becomes part of the gain medium of the laser. The presence of the magnetic field B will cause the charged negative oxygen ions to bend along the path of the Larmor radius; however, the neutral oxygen atoms will proceed unbent by the magnetic field to a test specimen 32. Therefore, the only particles reaching the test specimen 32 are oxygen atoms in a neutral charge and at a ground state, the energy of the oxygen atoms being determined by the difference in potential between the plates 20 and 22. In fact, if the potential applied to the plates 22 and 24 is $V_b$, the energy of the oxygen atoms reaching the test specimen will be $V_b/2$. By adjusting $V_b$ to a desired potential, the atoms reaching this test specimen can be of a predetermined energy. In the case of a simulation of the atmosphere at low earth orbit altitudes, the energy of the oxygen atoms reaching the test specimen is chosen to be approximately five electron volts. In order to maximize the ion production, the electron beam energy in the reaction region is preferably maintained at the resonance peak of the attachment curve for the molecules in the attachment region, in the illustrated case $N_2O$. The energy of the electron beam is determined by the potential on grid 18. Since the electron beam is physically midway between the parallel plates 20 and 22 it is also desirable to maintain a grid 18 at a potential that is midway between the potential difference $V_b$ existing between the plates 20 and 22. The grid 18 is therefore tied to a potential of $V_b/2$.

Figure 2:
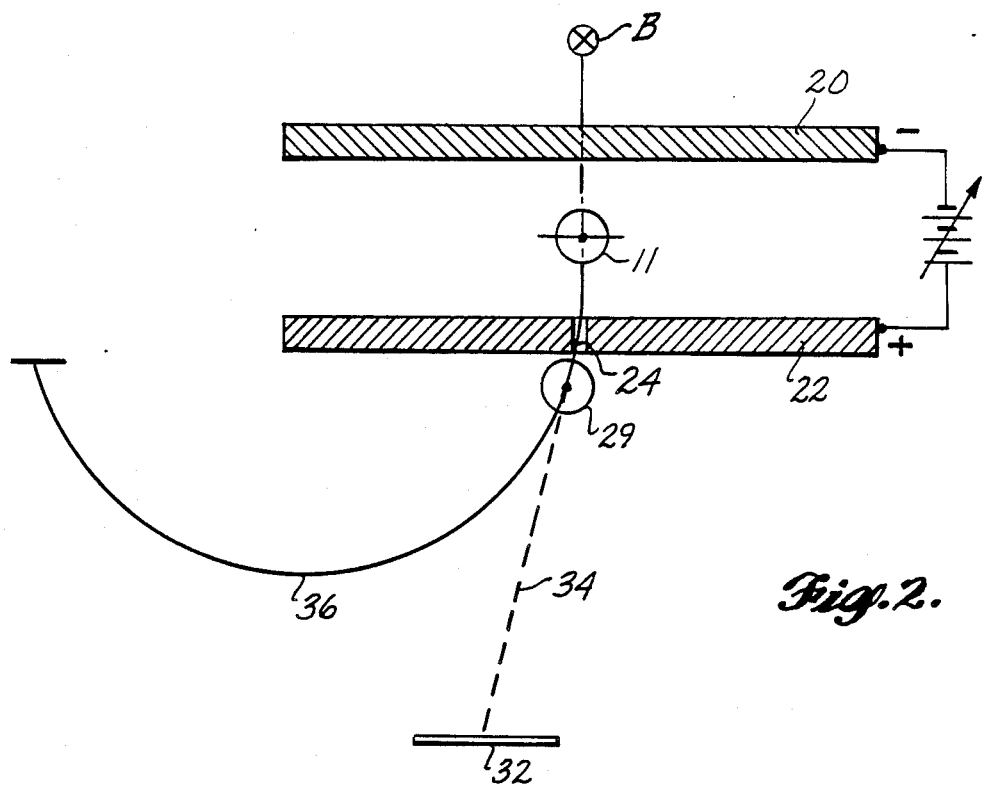
FIG. 2 is a somewhat schematic view of the apparatus of FIG. 1 as viewed from the right in the orientation of FIG. 1.

The bending of the oxygen ions by the magnetic field is best viewed in FIG. 2, which is a view from the right as viewed in FIG. 1, such that the electron beam 11 comes out of the page as does the laser light beam 29. The magnetic field lines B are directed into the page as viewed in FIG. 2. Note that the ions will experience some bend prior to the point at which they enter the laser region and become photodetached. After detachment, the stream of neutral oxygen atoms will continue in a straight line as indicated by dotted line 34, which strikes the target 32 while the trajectory of the negative oxygen ions will continue along the curve defined by the Larmor radius as they continue to be bent by the magnetic field B is indicated by the solid line 36.

As discussed above, the disclosed reaction of the electron capture with nitrous oxide and subsequent dissociation to form oxygen ions is only one of many reactions that can be utilized with the apparatus of the present invention to produce monatomic beams of particles. For example, in order to produce a beam of atomic hydrogen, the reaction region 12 would contain $H_2$ molecules that would then interact with electron from the cathode C to form hydrogen atoms and hydrogen ions. In this case, the energy of the electrons emitted by the cathode would be predetermined to approximately 13.95 electron volts in order to cause the reaction:

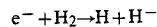

The negative hydrogen ions could then be drawn from the interaction region by the electric field across plates 20 and 22, for exposure to the laser, which, in this case, would have a wavelength of less than 1.646 microns in order to photodetach the electron from the hydrogen ion to produce neutral hydrogen atoms. Any hydrogen ions from which the electron did not photodetach will be bent by the magnetic field B away from the test specimen or collection point, as the case may be. As will be understood by those of ordinary skill, other elemental atomic beams can be produced. The method and apparatus of the present invention can also be utilized to produce beams of several radicals, such as $OH^-$, $NO^-$, $CH^-$ and others. Of course, the reactions to produce these beams will all be different from those described above; however, they are within the scope of knowledge of the persons skilled in the art. Also, energy of the electron beam produced by the cathode and the wavelength of the laser beam will have to be varied in accordance with the reaction to be produced. It is important to remember that the wavelength of the laser beam must be such that the laser has sufficient energy to detach the electrons as required but not to excite the atoms from the ground state.

In summary, therefore, a method and an apparatus to produce monatomic beams of neutral atoms at ground state is provided in which the process of electron capture by a molecule in a low-pressure environment is utilized. The molecule after electron capture will dissociate into a desired elemental ion, which can be drawn out of the electron reaction region by the application of an electric field to the reaction region, which, at the same time, accelerates the ions to the desired energy. After the ion is drawn out of the reaction region, it is subjected to a laser beam of a wavelength sufficient to photodetach the electron from a substantial number of the ions. The beam of neutral atoms having the electron photodetached then proceeds on to a test specimen while the remaining ions are bent by a magnetic field in a path that takes them away from the test specimen. The magnetic field used to bend the path of the negative ions is also the same magnetic field that is applied to the reaction region to collimate the electron beam.

While a preferred embodiment of the invention has been described and illustrated herein, it will be understood by those of ordinary skill in the art and others that changes can be made to the illustrated and described embodiment while remaining within the scope of the present invention. Therefore, the present invention should be defined solely with reference to the appended claims.

The embodiments of the invention in which as exclusive property or privilege is claimed are defined as follows:

1. A method of producing a beam of neutral atoms of a first element in which substantially all of the atoms are at the ground state, comprising the steps of:
    (a) directing a beam of electrons of predetermined energy into a low-pressure environment containing molecules of a first type, said molecules containing said first element such that said molecules capture electrons from said beam and then dissociate to produce negative ions of said first element;
    (b) applying an electric field to said environment to draw said ions out of said environment;
    (c) illuminating said drawn out ions with a laser beam of predetermined wavelength to photodetach electrons from a substantial number of said ions; and
    (d) separating the photodetached neutral atoms from the ions remaining after exposure to said laser beam by applying a magnetic field to bend said ions out of the path of said neutral atoms.

2. The method of claim 1, wherein said magnetic field is also used to collimate the electron beam.

3. The method of claim 1, wherein said electric field is set to a predetermined value to accelerate said ions to a desired energy level.

4. The method of claim 1, wherein said first element is oxygen, said first type of molecules is $N_2O$.

5. The method of claim 1, wherein the first element is hydrogen and said molecules of said first type are $H_2$ molecules.

6. An apparatus for producing a beam of neutral atoms of a first element in which substantially all of the atoms are at ground state comprising an interaction region for containing molecules of a first type;
    means for maintaining said interaction region at a low pressure;
    means for producing an electron beam of predetermined energy, said means being adapted to direct said electron beam into said interaction region;
    means for producing an electric field in said interaction region to draw ions out of said interaction region;
    a laser source constructed and arranged to expose said ions leaving said interaction region to the laser beam from said laser source, said laser beam being of a wavelength sufficient to detach electrons from a substantial number of said ions; and
    means for separating said ions from said atoms remaining after photodetachment.

7. The apparatus of claim 6, wherein said means for separating said ions from said neutral atoms is a source for producing a magnetic field.

8. The apparatus of claim 7, further including collimating means for collimating said electron beam, said collimating means comprising said magnetic field.

9. The apparatus of claim 6, wherein said laser source is adapted to cause said beam therefrom to interact with the ion beam in an intracavity fashion.

10. The apparatus of claim 6, wherein said laser source is a continuous wave laser.

11. The apparatus of claim 6, wherein said laser source is a pulsed laser.

12. The apparatus of claim 6, wherein said pressure maintaining means is adapted to maintain said pressure in the range of $5 \times 10^{-4}$ Torr to $1 \times 10^{-3}$ Torr.

13. The apparatus of claim 6, wherein said interaction region is bounded by first and second plates being charged to a potential difference of $V_b$, said resulting beam of neutral atoms having an energy of substantially $V_b/2$.

* * * * *